(12) United States Patent
Bartosz et al.

(10) Patent No.: US 11,286,857 B2
(45) Date of Patent: Mar. 29, 2022

(54) TURBINE-TURBINE GENERATOR POWER THERMAL MANAGEMENT SYSTEM

(71) Applicant: HAMILTON SUNDSTRAND CORPORATION, Charlotte, NC (US)

(72) Inventors: Lance R. Bartosz, Granby, MA (US); Tony Ho, Glastonbury, CT (US); Alan Retersdorf, Avon, CT (US); Matthew Pess, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 337 days.

(21) Appl. No.: 16/397,165

(22) Filed: Apr. 29, 2019

(65) Prior Publication Data

US 2020/0340403 A1    Oct. 29, 2020

(51) Int. Cl.
| | |
|---|---|
| *F02C 7/18* | (2006.01) |
| *B64D 33/08* | (2006.01) |
| *B64D 41/00* | (2006.01) |
| *F02C 6/08* | (2006.01) |

(Continued)

(52) U.S. Cl.
CPC ............. *F02C 7/185* (2013.01); *B64D 13/08* (2013.01); *B64D 33/08* (2013.01); *B64D 41/00* (2013.01); *F02C 6/08* (2013.01); *B64D 2013/0603* (2013.01); *B64D 2013/0644* (2013.01);

(Continued)

(58) Field of Classification Search
CPC . F02C 7/185; F02C 6/08; B64D 33/08; B64D 41/00; B64D 13/08; B64D 2013/0603; B64D 2013/0644; B64D 2013/0648; F05D 2220/50; F05D 2220/76; F05D 2260/213
See application file for complete search history.

(56) References Cited

U.S. PATENT DOCUMENTS

| | | | |
|---|---|---|---|
| 4,503,666 A | * | 3/1985 | Christoff ................ B64D 41/00 60/785 |
| 5,442,905 A | | 8/1995 | Claeys et al. |
| 5,461,882 A | | 10/1995 | Zywiak et al. |

(Continued)

FOREIGN PATENT DOCUMENTS

| | | |
|---|---|---|
| EP | 1279594 A1 | 1/2003 |
| EP | 2647571 A1 | 10/2013 |

(Continued)

OTHER PUBLICATIONS

European Search Report for European Application No. 19212129.1, dated Jul. 8, 2020, 10 pages.

*Primary Examiner* — Alain Chau
(74) *Attorney, Agent, or Firm* — Cantor Colburn LLP

(57) ABSTRACT

A thermal management system for one or more aircraft components includes a bleed airflow source at a gas turbine engine of the aircraft, one or more turbines configured to expand the bleed airflow, thus lowering a temperature of the bleed airflow, the bleed airflow driving rotation of the one or more turbines. One or more heat exchangers are in fluid communication with the one or more turbines. The one or more heat exchangers are configured to exchange thermal energy between the bleed airflow and a thermal load. One or more electrical generators are operably connected to the one or more turbines. The one or more electrical generators are configured to convert rotational energy of the one or more turbines to electrical energy.

20 Claims, 3 Drawing Sheets

(51) Int. Cl.
   *B64D 13/08* (2006.01)
   *B64D 13/06* (2006.01)
(52) U.S. Cl.
   CPC .............. *B64D 2013/0648* (2013.01); *F05D 2260/201* (2013.01); *F05D 2260/213* (2013.01)

(56) References Cited

U.S. PATENT DOCUMENTS

| | | | |
|---|---|---|---|
| 5,899,085 A | 5/1999 | Williams | |
| 5,924,293 A * | 7/1999 | Jonqueres | B64D 13/06 62/86 |
| 5,939,800 A | 8/1999 | Artinian et al. | |
| 6,124,646 A | 9/2000 | Artinian et al. | |
| 6,128,909 A * | 10/2000 | Jonqueres | B64D 13/06 62/87 |
| 6,148,622 A * | 11/2000 | Sanger | B64D 13/06 62/88 |
| 6,415,595 B1 * | 7/2002 | Wilmot, Jr. | F02C 7/224 60/785 |
| 6,526,775 B1 * | 3/2003 | Asfia | B64D 13/06 62/402 |
| 6,615,606 B2 * | 9/2003 | Zywiak | B64D 13/06 62/402 |
| 6,848,261 B2 * | 2/2005 | Claeys | B64D 13/06 62/87 |
| 7,222,499 B2 * | 5/2007 | Hunt | B64D 13/06 62/402 |
| 7,779,644 B2 * | 8/2010 | Decrisantis | B64D 13/06 62/401 |
| 8,019,522 B2 | 9/2011 | Coons | |
| 8,347,647 B2 * | 1/2013 | McAuliffe | F25B 9/004 62/401 |
| 8,418,495 B2 * | 4/2013 | Merritt | B64D 13/06 62/402 |
| 9,534,538 B1 | 1/2017 | Cerny | |
| 9,669,936 B1 | 6/2017 | Fiterman et al. | |
| 10,155,592 B2 * | 12/2018 | McAuliffe | B64D 13/06 |
| 10,160,547 B2 * | 12/2018 | Bruno | B64D 13/06 |
| 2003/0126880 A1 * | 7/2003 | Zywiak | B64D 13/06 62/402 |
| 2004/0195447 A1 * | 10/2004 | Claeys | B64D 13/06 244/118.5 |
| 2013/0111917 A1 | 5/2013 | Ho et al. | |
| 2015/0314878 A1 * | 11/2015 | Lukens | B64D 13/06 62/61 |
| 2016/0347456 A1 * | 12/2016 | Bruno | B64D 13/06 |
| 2020/0108937 A1 * | 4/2020 | Behrens | B64D 13/06 |

FOREIGN PATENT DOCUMENTS

| | | |
|---|---|---|
| EP | 3263866 A1 | 1/2018 |
| EP | 3489488 A1 | 5/2019 |

\* cited by examiner

TURBINE-TURBINE GENERATOR POWER THERMAL MANAGEMENT SYSTEM

BACKGROUND

Exemplary embodiments pertain to the art of environmental control systems (ECSs) for aircraft coupled to a gas turbine engine of the aircraft.

ECSs provide a supply of conditioned air to an enclosure, such as an aircraft cabin and cockpit, or other heat loads. In a conventional system, a flow of bleed air is taken from a bleed source, for example, an intermediate or high pressure stage of a gas turbine engine compressor. The bleed air is pre-cooled via an air-to-air heat exchanger with heat being rejected to ram air. The pre-cooled bleed air is then flowed to a turbine. After expansion at the turbine the expanded air is flowed across one or more heat exchangers for thermal exchange with cooling flow, either air or liquid. The cooling flow, after being cooled by the airflow at the heat exchanger, is used to cool a heat load, for example, an enclosure, cockpit or component of the aircraft.

In a typical system, the ECS uses a compressor-turbine set up, known as a bootstrap air cycle. In other ECS systems, turbines are coupled to a gearbox of the gas turbine engine, with the gearbox serving to load the turbines. Such a configuration, however, places the turbines on the engine gearbox, which requires long ducts to the gearbox to provide the airflow thereto. In some operating conditions, the ducts may be at sub-freezing temperatures, resulting in ice accretion in the ducts. The ice restricts flow and inhibits ECS system performance. Further, since the system is connected to the engine gearbox, it will need to be de-clutched from the engine core and loaded in come other manner to achieve cooling performance when the engine is off.

BRIEF DESCRIPTION

In one embodiment, a thermal management system for one or more aircraft components includes a bleed airflow source at a gas turbine engine of the aircraft, one or more turbines configured to expand the bleed airflow, thus lowering a temperature of the bleed airflow, the bleed airflow driving rotation of the one or more turbines. One or more heat exchangers are in fluid communication with the one or more turbines. The one or more heat exchangers are configured to exchange thermal energy between the bleed airflow and a thermal load. One or more electrical generators are operably connected to the one or more turbines. The one or more electrical generators are configured to convert rotational energy of the one or more turbines to electrical energy.

Additionally or alternatively, in this or other embodiments the electrical energy is transmitted to a power management system of the aircraft for use to power one or more aircraft components.

Additionally or alternatively, in this or other embodiments the one or more turbines are closely coupled to the one or more electrical generators.

Additionally or alternatively, in this or other embodiments the one or more turbines is at least two turbines, and each turbine of the at least two turbines is operably connected to a different electrical generator of the one or more electrical generators.

Additionally or alternatively, in this or other embodiments the one or more thermal loads are one or more of an aircraft cockpit, passenger cabin, cargo compartment or one or more components of the aircraft.

Additionally or alternatively, in this or other embodiments the bleed airflow source is a compressor section of a gas turbine engine.

Additionally or alternatively, in this or other embodiments the one or more heat exchangers exchange thermal energy between the bleed airflow and a thermal load via a cooling medium flowed between the thermal load and the one or more heat exchangers.

In another embodiment, an aircraft includes a gas turbine engine, one or more thermal loads, and a thermal management system. The thermal management system includes a bleed airflow source at the gas turbine engine, one or more turbines configured to expand the cooling airflow, thus lowering a temperature of the bleed airflow, the bleed airflow driving rotation of the one or more turbines, and one or more heat exchangers in fluid communication with the one or more turbines. The one or more heat exchangers are configured to exchange thermal energy between the bleed airflow and the one or more thermal loads. One or more electrical generators are operably connected to the one or more turbines. The one or more electrical generators are configured to convert rotational energy of the one or more turbines to electrical energy.

Additionally or alternatively, in this or other embodiments the electrical energy is transmitted to a power management system of the aircraft for use to power one or more aircraft components.

Additionally or alternatively, in this or other embodiments the one or more turbines are closely coupled to the one or more electrical generators.

Additionally or alternatively, in this or other embodiments the one or more turbines is at least two turbines, and each turbine of the at least two turbines is operably connected to a different electrical generator of the one or more electrical generators.

Additionally or alternatively, in this or other embodiments the one or more thermal loads are one or more of an aircraft cockpit, passenger cabin, cargo compartment or one or more components of the aircraft.

Additionally or alternatively, in this or other embodiments the bleed airflow source is a compressor section of the gas turbine engine.

Additionally or alternatively, in this or other embodiments the one or more heat exchangers exchange thermal energy between the bleed airflow and a thermal load via a cooling medium flowed between the thermal load and the one or more heat exchangers.

In another embodiment, a method of thermal management of one or more aircraft components includes urging a bleed airflow from a bleed airflow source at a gas turbine engine of the aircraft toward one or more turbines of a thermal management system, expanding and cooling the bleed airflow at the one or more turbines, thereby rotating the one or more turbines, urging the cooling airflow through one or more heat exchangers for thermal energy exchange with one or more thermal loads, and converting the rotational energy of the one or more turbines to electrical energy at an electrical generator operably connected to the one or more turbines.

Additionally or alternatively, in this or other embodiments the electrical energy is transmitted to a power management system of the aircraft for use to power one or more aircraft components.

Additionally or alternatively, in this or other embodiments the one or more turbines is at least two turbines, and each turbine of the at least two turbines is operably connected to a different electrical generator of the one or more electrical generators.

Additionally or alternatively, in this or other embodiments the one or more thermal loads are one or more of an aircraft cockpit, passenger cabin, cargo compartment or one or more components of the aircraft.

Additionally or alternatively, in this or other embodiments urging the bleed airflow from the bleed airflow source includes urging the bleed airflow from a compressor section of gas turbine engine.

Additionally or alternatively, in this or other embodiments the one or more heat exchangers exchange thermal energy between the bleed airflow and a thermal load via a cooling medium flowed between the thermal load and the one or more heat exchangers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
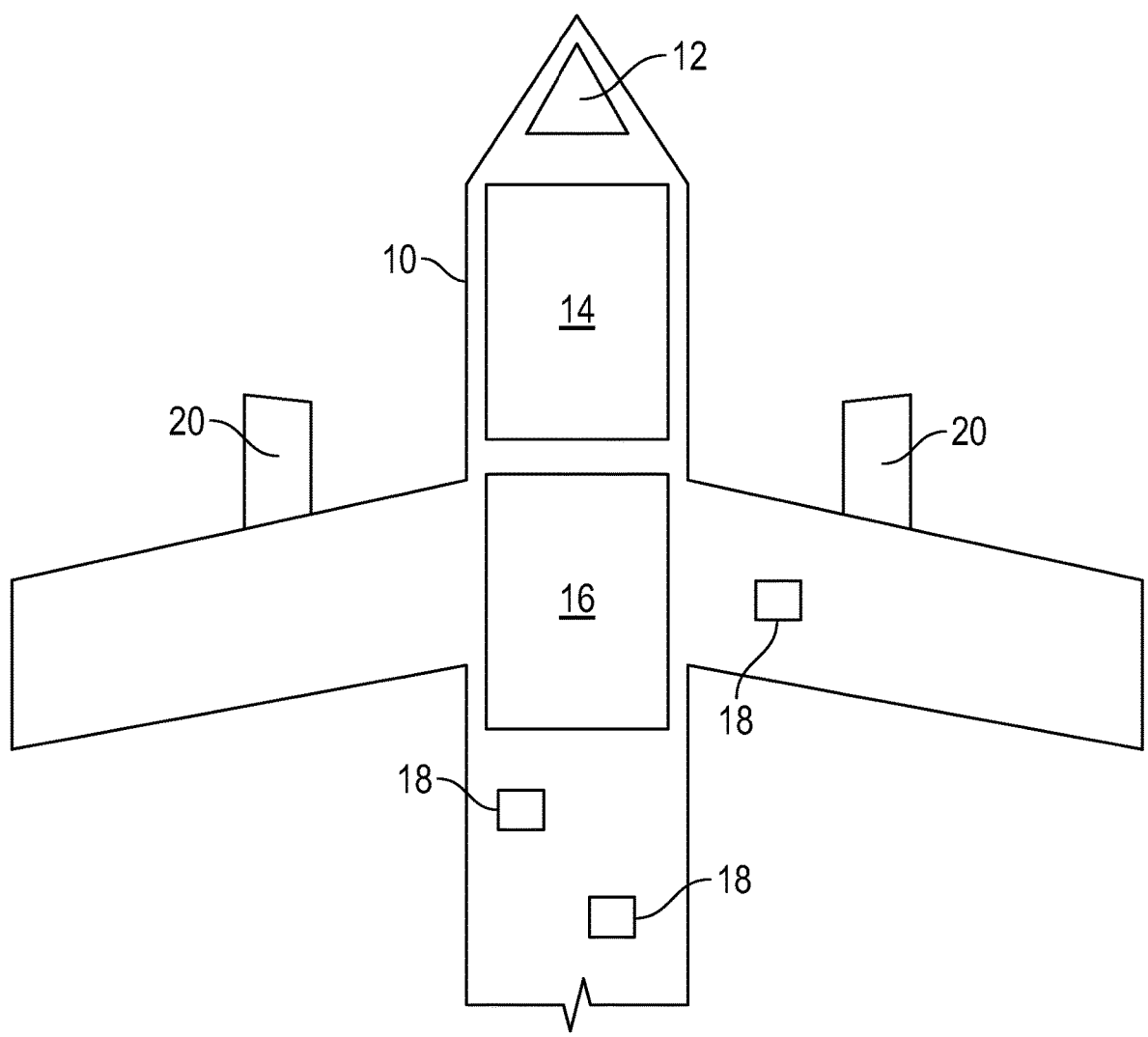
FIG. 1 is a schematic illustration of an aircraft.

Referring to FIG. 1, shown is a schematic illustration of an aircraft 10. The aircraft 10 includes one or more areas or components that are thermal loads and require cooling or other thermal management. Such thermal loads may include an aircraft cockpit 12, cargo hold 14, passenger cabin 16 or one or more electronic components 18 or systems throughout the aircraft 10. The aircraft 10 is powered by one or more gas turbine engines 20.

Figure 2:
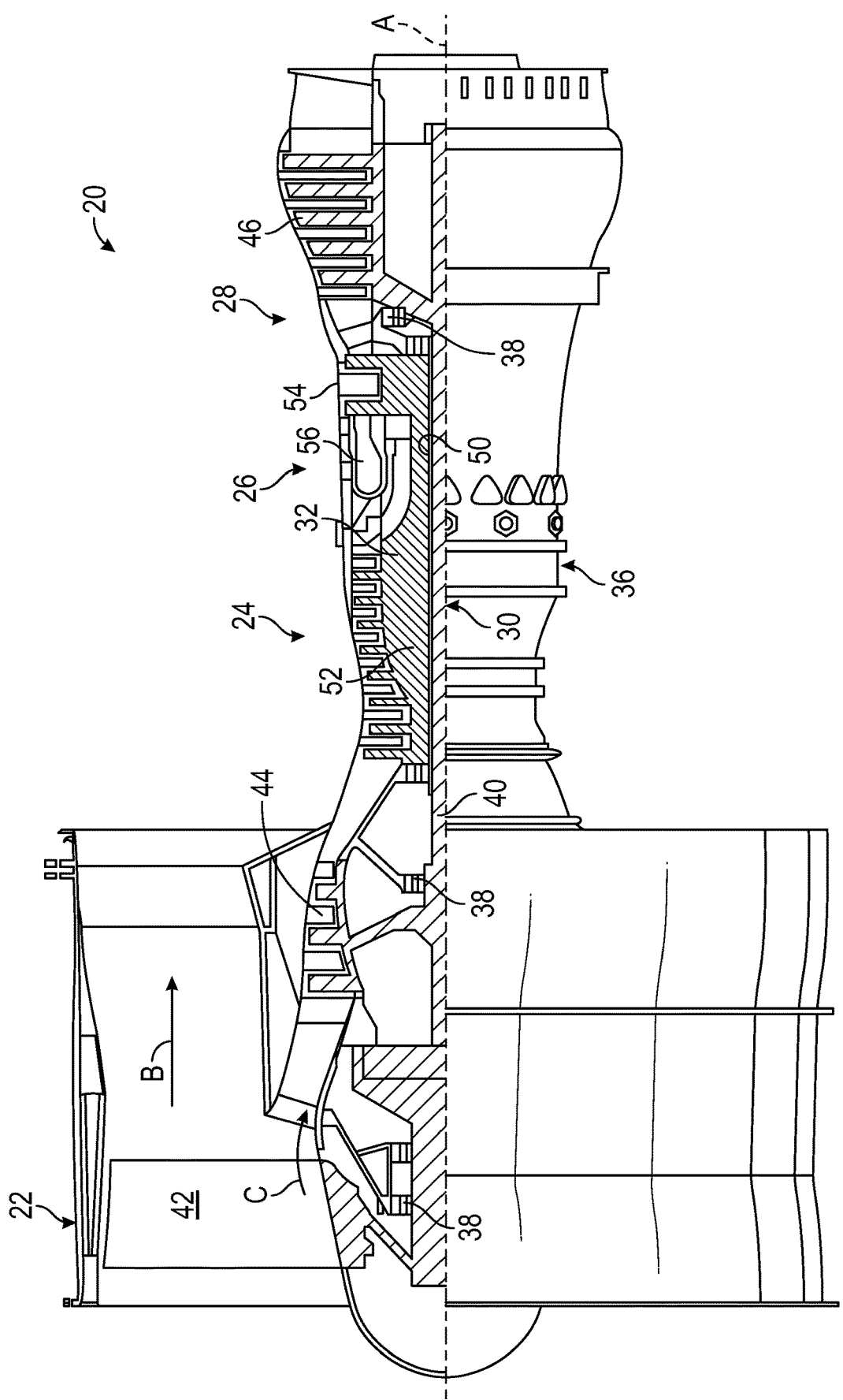
FIG. 2 is a partial cross-sectional view of an embodiment of a gas turbine engine of an aircraft.

Referring to FIG. 2, a schematic view of a gas turbine engine 20 is shown. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including single-spool and three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

Figure 3:
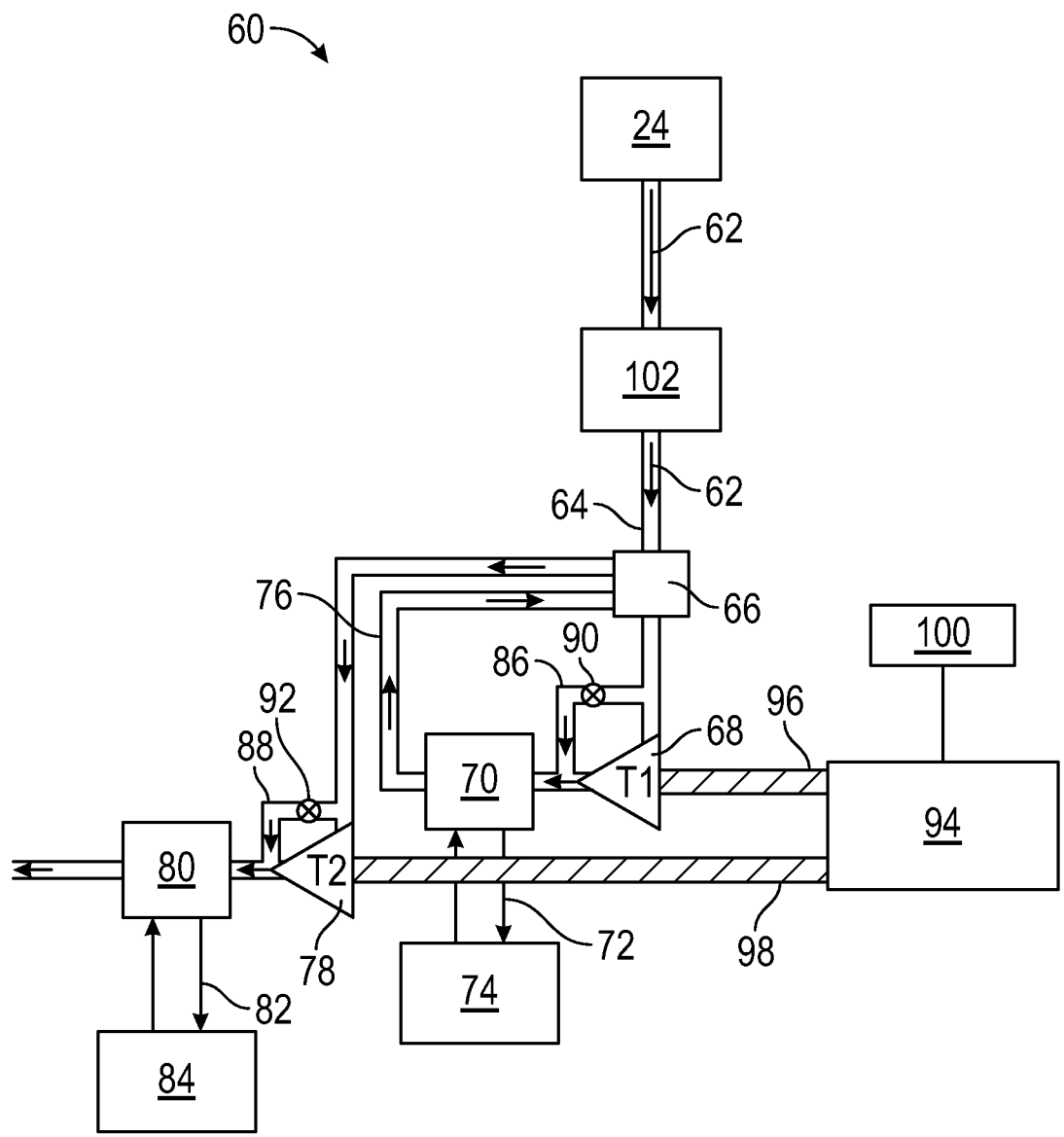
FIG. 3 is a schematic illustration of an embodiment of a thermal management system for one or more components of an aircraft.

Referring to FIG. 3, illustrated is a schematic of an exemplary thermal management system 60 for, thermal management of one or more of the thermal loads of the aircraft 10 (shown in FIG. 1). The thermal management system 60 is utilized to provide conditioned airflow to cool the one or more thermal loads, such as the aircraft cockpit 12, the cargo hold 14, the passenger cabin 16 or the one or more electronic components 18 or systems of the aircraft 10. The thermal management system 60 utilizes airflow from the gas turbine engine 20 of the aircraft as the airflow source for use by the thermal management system 60.

In some embodiments, the source airflow is bleed airflow 62 from the compressor section 24 of the gas turbine engine 20 via a bleed passage 64. The bleed passage 64 directs the bleed airflow 62 through a precooler 102 and through an intermediate heat exchanger 66. The bleed airflow 62 is expanded at a first turbine 68 downstream of the intermediate heat exchanger 66. The expanded and thus cooled bleed airflow 62 is then directed through a first heat exchanger 70. At the first heat exchanger 70, the bleed airflow 62 exchanges thermal energy with a first cooling medium 72. The first cooling medium 72 may be, for example, air or a liquid refrigerant, and is flowed between the first heat exchanger 70 and a first thermal load 74. The bleed airflow 62 cools the first cooling medium 72 at the first heat exchanger 70, and the first cooling medium 72 is directed to the first thermal load 74 to condition or cool the first thermal load 74.

From the first heat exchanger 70, the bleed airflow 62 is directed back to the intermediate heat exchanger 66 along passageway 76 for thermal exchange with the bleed airflow 62 entering the intermediate heat exchanger 66 via the bleed passage 64. Upon leaving the intermediate heat exchanger 66, the bleed airflow in passageway 76 is directed toward a second turbine 78, where the bleed airflow 62 is expanded and thereby cooled. The bleed airflow 62 is then directed through a second heat exchanger 80. At the second heat exchanger 80, the bleed airflow 62 exchanges thermal energy with a second cooling medium 82. The second cooling medium 82 may be, for example, air or a liquid refrigerant, and is flowed between the second heat exchanger 80 and a second thermal load 84. The bleed airflow 62 cools the second cooling medium 82 at the second heat exchanger 80, and the second cooling medium 82 is directed to the second thermal load 84 to condition or cool the second thermal load 84.

In some embodiments, the thermal management system 60 includes a first turbine bypass passage 86 and/or a second turbine bypass passage 88 allowing the bleed airflow 62 to bypass the first turbine 68 or the second turbine 78, respectively. A first bypass valve 90 is located at the first turbine bypass passage 86 and is operated to selectably direct the bleed airflow 62 to the first turbine 68 or along the first turbine bypass passage 86 based on, for example, operational needs of the thermal management system 60 for cooling of the first thermal load 74. Similarly, a second bypass valve 92 is located at the second turbine bypass passage 88 and is operated to selectably direct the bleed airflow 62 to the second turbine 78 or along the first turbine bypass passage 88 based on, for example, operational needs of the thermal management system 60 for cooling of the second thermal load 84.

The thermal energy of the bypass airflow 62 flowing through the first turbine 68 and the second turbine 78 is converted to rotational energy of the first turbine 68 and the second turbine 78. This rotational energy is converted to electrical energy by an electrical generator 94 connected to the first turbine 68 and the second turbine 78 through, for example, a first turbine shaft 96 and a second turbine shaft 98, respectively. While FIG. 3 illustrates the first turbine 68 and the second turbine 78 connected to the same electrical generator 94, in other embodiments the first turbine 68 and the second turbine 78 may be operably connected to separate electrical generators 94. Further, while two turbines 68, 78 are shown in the FIGS. and described herein, it is to be appreciated that other quantities of turbines, for example, three, four or five turbines, may be utilized.

Electrical energy from the electrical generator 94 is utilized by a power distribution system 100 of the aircraft 10 to power components and systems of the aircraft 10. In some embodiments, the turbines 68, 78 are closely-coupled to the electrical generator 94 and with the heat exchangers 66, 70, 80. Further, the turbines 68, 78 are not connected to a gearbox of the engine 20, and are therefore not dependent on gearbox rotation and loading for operation of the turbines 68, 78, and also eliminates integration concerns with the gearbox. Further, the turbines 68, 78, via the electrical generator 94 provide an additional source of electrical power for the aircraft 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A thermal management system for one or more aircraft components, comprising:
   a bleed airflow source at a gas turbine engine of the aircraft;
   a first turbine and a second turbine configured to expand the bleed airflow, thus lowering a temperature of the bleed airflow, the bleed airflow driving rotation of the first turbine and the second turbine, the first turbine and the second turbine arranged in a fluidly serial arrangement;
   a first heat exchanger disposed between the first turbine and the second turbine, the first heat exchanger configured to exchange thermal energy between the bleed airflow and a first thermal load;
   a second heat exchanger disposed fluidly downstream of the second turbine, the second heat exchanger configured to exchange thermal energy between the bleed airflow and a second thermal load; and
   one or more electrical generators operably connected to the first turbine and the second turbine, the one or more electrical generators configured to convert rotational energy of the first turbine and the second turbine to electrical energy.

2. The thermal management system of claim 1, wherein the electrical energy is transmitted to a power management system of the aircraft for use to power the one or more aircraft components.

3. The thermal management system of claim 1, wherein the first turbine and the second turbine coupled to the one or more electrical generators.

4. The thermal management system of claim 1, wherein first turbine and the second turbine are each operably connected to a different electrical generator of the one or more electrical generators.

5. The thermal management system of claim 1, wherein the first thermal load and the second thermal load are one or more of an aircraft cockpit, passenger cabin, cargo compartment or the one or more aircraft components.

6. The thermal management system of claim 1, wherein the bleed airflow source is a compressor section of the gas turbine engine.

7. The thermal management system of claim 1, wherein the first heat exchanger and the second heat exchanger exchange thermal energy between the bleed airflow and a thermal load of the first thermal load and the second thermal load via a cooling medium flowed between the respective thermal load and the first heat exchanger and the second heat exchanger.

8. An aircraft comprising:
   a gas turbine engine;
   a first thermal load and a second thermal load; and
   a thermal management system, including:
      a bleed airflow source at the gas turbine engine;
      a first turbine and a second turbine configured to expand the bleed airflow, thus lowering a temperature of the bleed airflow, the bleed airflow driving rotation of the first turbine and the second turbine, the first turbine and the second turbine arranged in a fluidly serial arrangement;

a first heat exchanger disposed between the first turbine and the second turbine, the first heat exchanger configured to exchange thermal energy between the bleed airflow and the first thermal load;

a second heat exchanger disposed fluidly downstream of the second turbine, the second heat exchanger configured to exchange thermal energy between the bleed airflow and the second thermal load; and one or more electrical generators operably connected to the first turbine and the second turbine, the one or more electrical generators configured to convert rotational energy of the first turbine and the second turbine to electrical energy.

9. The aircraft of claim 8, wherein the electrical energy is transmitted to a power management system of the aircraft for use to power one or more aircraft components.

10. The aircraft of claim 8, wherein the first turbine and the second turbine coupled to the one or more electrical generators.

11. The aircraft of claim 8, wherein the first turbine and the second turbine are each operably connected to a different electrical generator of the one or more electrical generators.

12. The aircraft of claim 8, wherein the first thermal load and the second thermal load are one or more of an aircraft cockpit, passenger cabin, cargo compartment or one or more components of the aircraft.

13. The aircraft of claim 8, wherein the bleed airflow source is a compressor section of the gas turbine engine.

14. The aircraft of claim 8, wherein the first heat exchanger and the second heat exchanger exchange thermal energy between the bleed airflow and a thermal load of the first thermal load and the second thermal load via a cooling medium flowed between the respective thermal load and the first heat exchanger and the second heat exchanger.

15. A method of thermal management of one or more aircraft components, comprising:

urging a bleed airflow from a bleed airflow source at a gas turbine engine of the aircraft toward a first turbine and a second turbine of a thermal management system, the first turbine and the second turbine arranged in a fluidly serial arrangement;

expanding and cooling the bleed airflow at the first turbine, thereby rotating the first turbine;

urging the bleed airflow through a first heat exchanger for thermal energy exchange with a first thermal load, the first heat exchanger disposed between the first turbine and the second turbine;

expanding and cooling the bleed airflow at the second turbine, thereby rotating the second turbine;

urging the bleed airflow through a second heat exchanger for thermal energy exchange with a second thermal load, the second heat exchanger disposed downstream of the second turbine;

converting the rotational energy of the first turbine and the second turbine to electrical energy at an electrical generator operably connected to the first turbine and the second turbine.

16. The method of claim 15, further comprising transmitting the electrical energy to a power management system of the aircraft for use to power one or more aircraft components.

17. The method of claim 15, wherein the first turbine and the second turbine are each operably connected to a different electrical generator of the one or more electrical generators.

18. The method of claim 15, wherein the first thermal load and the second thermal load are one or more of an aircraft cockpit, passenger cabin, cargo compartment or the one or more aircraft components.

19. The method of claim 15, wherein urging the bleed airflow from the bleed airflow source comprises urging the bleed airflow from a compressor section of the gas turbine engine.

20. The method of claim 15, wherein the first heat exchanger and the second heat exchanger exchange thermal energy between the bleed airflow and a thermal load of the first thermal load and the second thermal load via a cooling medium flowed between the respective thermal load and the first heat exchanger and the second heat exchanger.

* * * * *